July 26, 1932.  L. C. STUKENBORG  1,869,283
TABLE FOR VEHICLE LIFTS
Filed June 9, 1930   2 Sheets-Sheet 1
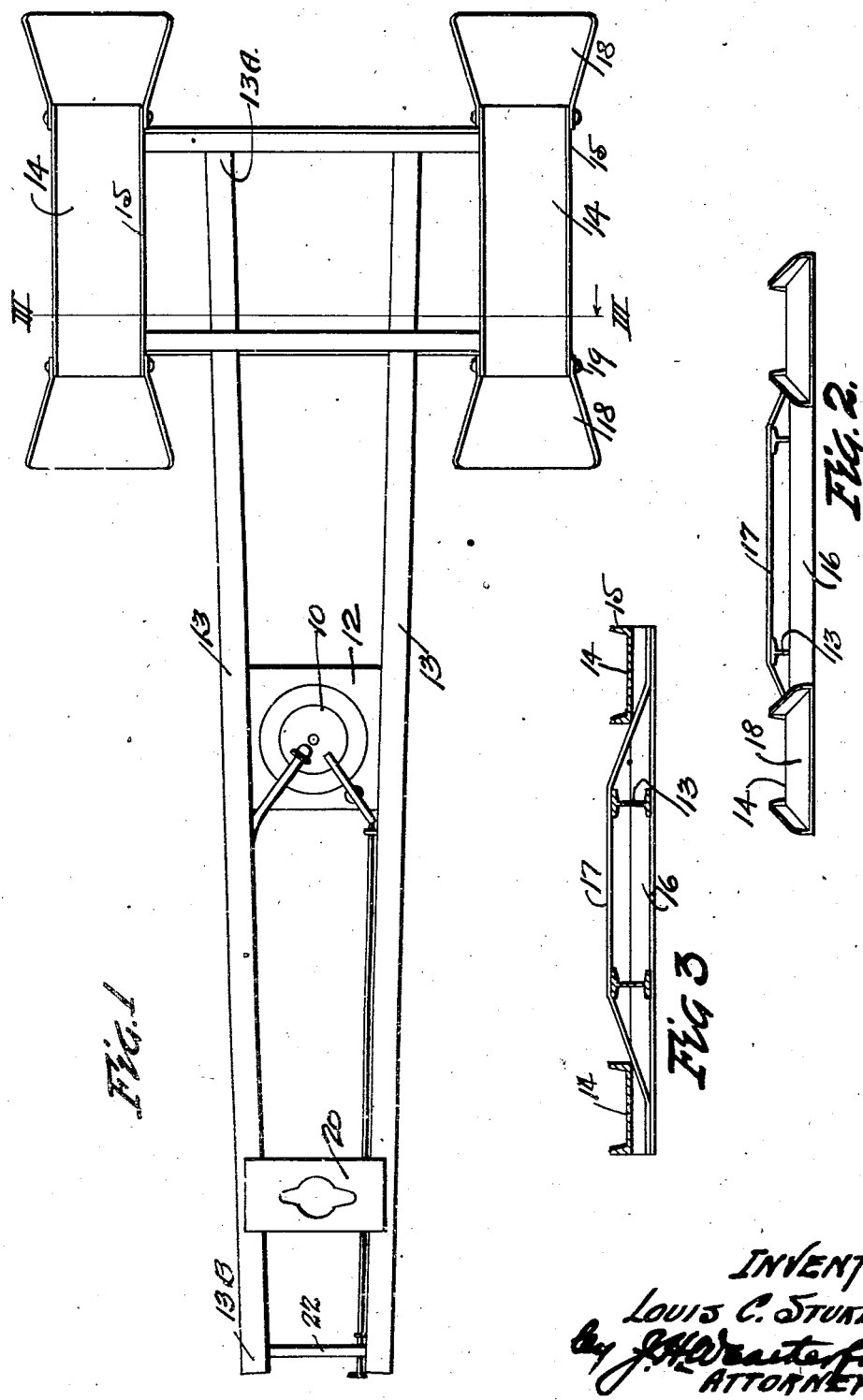

July 26, 1932.  L. C. STUKENBORG  1,869,283
TABLE FOR VEHICLE LIFTS
Filed June 9, 1930  2 Sheets-Sheet 2
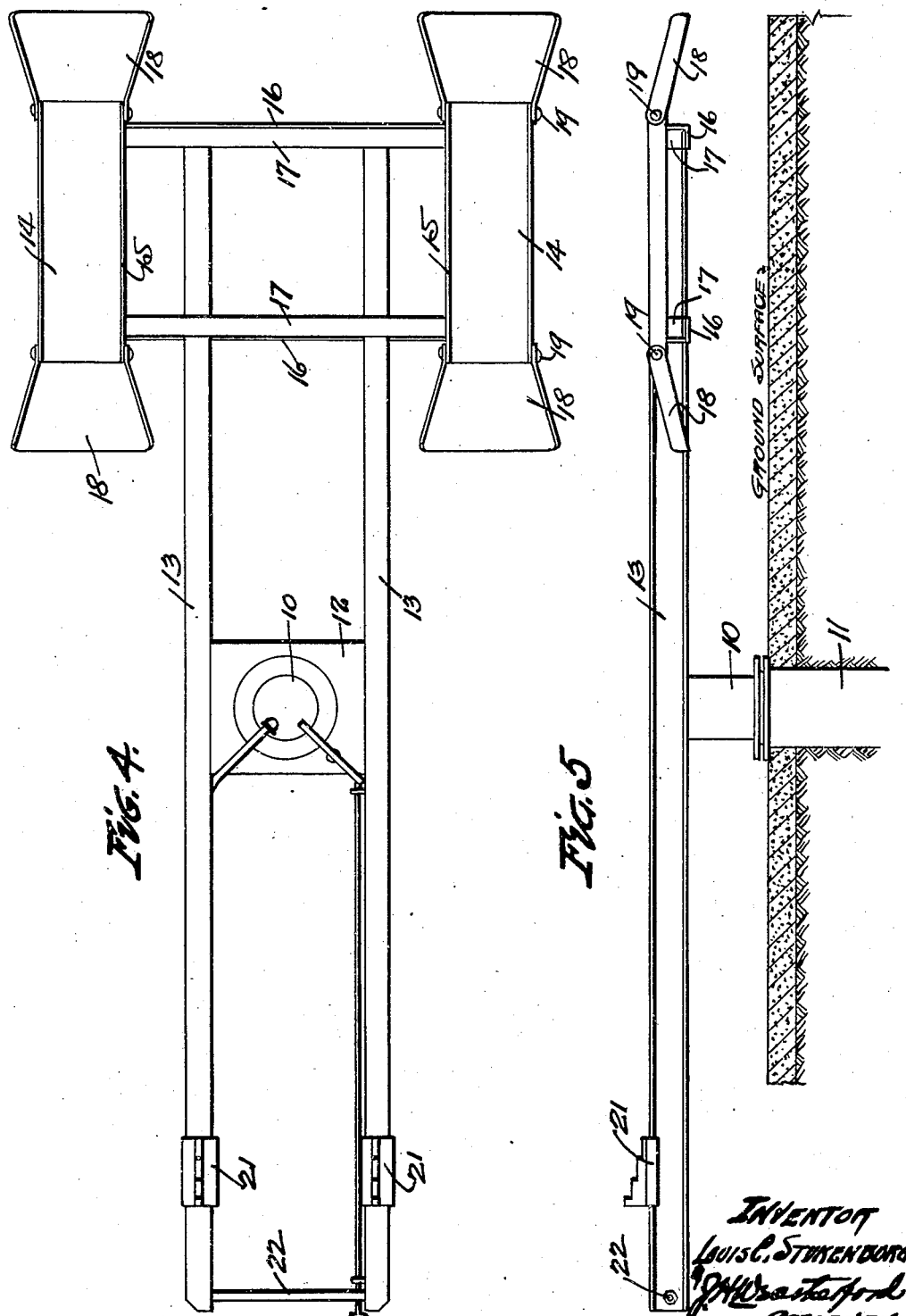

Patented July 26, 1932

1,869,283

UNITED STATES PATENT OFFICE

LOUIS C. STUKENBORG, OF MEMPHIS, TENNESSEE

TABLE FOR VEHICLE LIFTS

Application filed June 9, 1930. Serial No. 459,985.

This invenion relates to improvements in tables for vehicle lifts and has especial reference to tables for lifting automobiles, auto busses or the like, for greasing and/or servicing and is especially designed for use with a hydraulic jack by which the table is raised and lowered.

Vehicle lifts for automobiles, ordinarily comprise a vertically movable jack having a head thereon which supports a pair of rails. These rails are spaced so that they conform to the wheel tread of the auto in which case the auto is driven on to the rails and is raised with the wheels resting thereon; or they are spaced so that they lie entirely between the wheels of the auto and engage, usually through intermediate shoes or other parts, the axles of the auto and when raised support the auto with the wheels entirely free to turn or be removed, thus providing much more convenient access for servicing especially where a wheel has to be removed or a brake to be relined. Necessarily in the latter, or free wheel type, the supporting rails must be so close together that they do not interfere with brake parts or spring parts, though they are spaced as far apart as it is possible to place them without such interference. It is evident, however that while the wheel free type possesses a great many advantages over the other type it is open to the objection that the auto is rather insecurely balanced on table, and, especially where the auto has not been carefully centered longitudinally over the table there is danger that the auto will turn over sideways after it has been raised.

The primary object of the present invention therefore is to provide a table which will give wheel free access to the vehicle and which will at the same time provide means to prevent over-turning.

A further object is to provide a table in which the wheel free end is narrower than would otherwise be allowable in order that more room be maintained between such part of the table and the vehicle parts outward therefrom.

The means by which the foregoing and other objects are accomplished and the manner of their accomplishment will readily be understood from the following specification on reference to the accompanying drawings, in which:

Fig. 1 is a plan view of my table in preferred form;

Fig. 2 is an end view of the wheel supporting end of the table;

Fig. 3 is a transverse section of the same end of the table taken as on the line III—III of Fig. 1;

Fig. 4 is a plan view of a standard wheel free table rebuilt to conform to my improved form of table; and Fig. 5 is a side elevation of the table slightly raised above the surface of the ground.

Referring now to the drawings in which the various parts are indicated by numerals, 10 is the plunger of a hydraulic lift which is disposed in a cylinder 11, and is actuated by any desired means, which means not being a part of this invention need not here be disclosed. The plunger 10 carries a head 12, to which are secured longitudinal rails 13 preferably of I-beam section which extend substantially equal distances on either side of the plunger and head. In Fig. 4, these rails are disposed parallel to each other, they are spaced close enough together to lie entirely clear of the wheels and adjacent parts of the automobile which is to be raised by them, and at the same time they are spaced as far apart as is possible without interfering with these parts. In Fig. 1, I have shown the preferred form of the device in which the ends 13A of these rails are maintained at the distance apart previously established and shown in Fig. 4, whereas the opposite ends 13B have been brought closer together to allow more room outside of such converging end.

Disposed longitudinally along the ends 13A of these rails, laterally outside thereof, and at equal distances therefrom are short channels 14 which have upwardly extending flanges 15 which act as wheel guides. These channels are spaced apart so that they conform to the wheel tread of the auto or other vehicle which is to be raised. Disposed transversely across the rails 13 and preferably lying beneath the channels 14 are supports for these channels which may each comprise an angle 16 and a trussed flat strap 17, one of these supports lying adjacent the forward end of the channels and the other adjacent the rear end of the channels. These parts may be secured together in any well known manner which will provide secure attachment. 18 are short approach channel ways leading to the wheel supporting channels 14. These approach channels if desired may be hinged as by the pins 19 to the supporting channels.

20 (Fig. 1) is a support or shoe which may be disposed on the rails 13, and shifted therealong to bring it beneath the axle, especially the rear axle, of an automobile positioned over the rails and 21 (Fig. 4) are a pair of stepped shoes which likewise may be disposed on the rails 13 and are adapted to engage the front axle of an automobile positioned over the rails, when shifted along the rails into alignment with such axle.

One pair of rail ends is tied together by the transverse supports which carry the side rails, the other end may be braced and secured apart as by a transverse rod 22, if it be so desired.

In using this table, if the front end is to be so supported in wheel free position, the rear end of the table is turned toward the approaching auto, and the front wheels are driven over the channels 14 and the rear wheels brought to rest thereon. The front wheel shoes 21 are then placed on the rails and positioned under the front axle after which the jack is operated in usual manner and the vehicle raised. If the rear wheels are to be left free, the table is so turned that the auto approaches it from the wheel free end, the front wheels are driven on to the wheel supporting channels, the shoe 20 is placed on the rails and positioned under the rear axle and the jack operated in usual manner. It will be seen that in either event, support is provided against over turning, in that two of the wheels rest on the spaced wheel channels, and at the same time the other pair of wheels are left free for servicing.

After one end of the car has been serviced, the jack may be lowered, the car removed, the table turned 180 degrees, and the other end of the car be placed for similar wheel free servicing.

Having described my invention, what I claim is:

1. In a table for a vehicle lift, a pair of elongated rails, spaced to lie longitudinally between the wheels of a vehicle to be raised, a pair of short channels spaced to conform to the vehicle wheel tread, disposed along said rails opposite one end thereof, transverse supports one at each end of said channels, supporting same from said rails, and approach channels, at the ends of said short channels.

2. In a table for a vehicle lift, a pair of elongated rails, spaced apart to lie longitudinally between the wheels of a vehicle to be raised, a pair of short channels spaced to conform to the vehicle wheel tread, disposed along said rails opposite one end thereof, and transverse supports one at each end of said channels, supporting same from said rails.

3. A vehicle lift, including a vertically disposed piston and means for actuating same, a head carried by said piston, a pair of elongated rails carried by said head, and spaced apart to lie longitudinally between the wheels of a vehicle, one end of said rails being adapted to support an axle part of said vehicle, a pair of relatively short drive-on channels, spaced apart to conform to the wheel tread of said vehicle, disposed along the opposite end of said rails, and means for supporting said channels from said rails.

4. A vehicle lift, including a vertically disposed piston and means for actuating same, a head carried by said piston, a pair of elongated rails carried by said head, and spaced apart to lie longitudinally between the wheels of a vehicle, means slidably mounted on one end of said rails for engaging an axle part of said vehicle, a pair of relatively short drive-on channels, spaced apart to conform to the wheel tread of said vehicle, disposed along the opposite end of said rails, and means for supporting said channels from said rails.

5. In a table for a vehicle lift, a pair of elongated rails, spaced to lie longitudinally between the wheels of a vehicle to be raised, a pair of short channels spaced to conform to the wheel tread of the vehicle, disposed along one end of said rails, means carried by said rails, extending laterally outward therefrom, to support said drive-on supports and approach members, secured at the ends of said channels at least the inner pair of said approach members being hinged, whereby maximum accessibility to the sides of said rails is secured.

6. In a table for a vehicle lift, a pair of supporting rails adapted to engage one axle of a vehicle and a pair of drive-on platforms adapted to support the wheels on the other axle of said vehicle, said rails converging away from said wheel supporting end, whereby a vehicle supported on said axle support and wheel platform is held against overturning by said platforms and maximum access to said axle supported end is obtained.

In testimony whereof I hereunto affix my signature.

LOUIS C. STUKENBORG.